(12) United States Patent
Mattson et al.

(10) Patent No.: US 9,607,108 B2
(45) Date of Patent: *Mar. 28, 2017

(54) VARIATIONAL MODELING WITH REMOVAL FEATURES

(71) Applicant: Siemens Product Lifecycle Management Software Inc., Plano, TX (US)

(72) Inventors: Howard Charles Duncan Mattson, Cambridge (GB); Douglas Joseph King, Peterborough (GB); Peter Philip Lonsdale Nanson, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 692 days.

This patent is subject to a terminal disclaimer.

(21) Appl. No.: 14/070,024

(22) Filed: Nov. 1, 2013

(65) Prior Publication Data

US 2014/0058707 A1     Feb. 27, 2014

Related U.S. Application Data

(63) Continuation of application No. 12/893,557, filed on Sep. 29, 2010, now Pat. No. 8,612,184.

(51) Int. Cl.
*G06F 17/50* (2006.01)
*G06K 9/46* (2006.01)

(52) U.S. Cl.
CPC .......... *G06F 17/50* (2013.01); *G06F 17/5086* (2013.01); *G05B 2219/35082* (2013.01); *G06F 2217/06* (2013.01); *G06K 9/469* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 6,571,146 B1 | 5/2003 | Dennehy | |
| 6,888,542 B1 | 5/2005 | Clauss | |
| 7,042,451 B2 | 5/2006 | Venkataraman et al. | |
| 7,219,043 B2 | 5/2007 | Rebello et al. | |

(Continued)

OTHER PUBLICATIONS

K. Y. Lee, C. G. Armstrong, M. A. Price, and J. H. Lamont "A small Feature Suppression/Unsuppression System for Preparing B-Rep Models for Analysis" pp. 113-124, ACM 2005.*

(Continued)

*Primary Examiner* — Kibrom K Gebresilassie

(57) ABSTRACT

Systems, methods, and computer readable mediums. A method includes receiving a geometric model including at least one removal feature having at least one face, the removal feature being a feature that is removed prior to variational solving and recreated after a variational solution has been applied into the geometric model. The method includes designating at least one face of the removal feature as a remain variational face that will not be removed during a variational edit. The method includes adding a constraint to the remain variational face of the removal feature and performing the variational edit on the model to produce an edited model, including applying the constraint. The method includes storing the edited model.

14 Claims, 8 Drawing Sheets

(56) References Cited

U.S. PATENT DOCUMENTS

| | | | |
|---|---|---|---|
| 7,277,835 B2 | 10/2007 | Spitz et al. | |
| 7,472,044 B2* | 12/2008 | Landers | G06T 19/00 700/182 |
| 8,612,184 B2* | 12/2013 | Mattson | G06F 17/5086 703/1 |
| 9,117,308 B1* | 8/2015 | Nag | G06F 17/50 |
| 2001/0043209 A1* | 11/2001 | Nagakura | G06T 17/10 345/419 |
| 2003/0103083 A1* | 6/2003 | Denny | G06F 17/50 715/771 |
| 2003/0149498 A1 | 8/2003 | Rebello et al. | |
| 2003/0149502 A1* | 8/2003 | Rebello | G05B 19/4097 700/98 |
| 2004/0122630 A1* | 6/2004 | Fife | G06F 17/5018 703/2 |
| 2008/0252663 A1* | 10/2008 | Kripac | G06F 17/5086 345/681 |
| 2009/0259442 A1* | 10/2009 | Gandikota | G06F 17/50 703/1 |
| 2010/0013833 A1* | 1/2010 | Gandikota | G06F 17/50 345/420 |
| 2010/0238167 A1* | 9/2010 | Black | G06F 17/50 345/420 |
| 2012/0007864 A1* | 1/2012 | Lonsdale Nanson | G06F 17/50 345/420 |
| 2013/0124149 A1* | 5/2013 | Carr | G06F 17/50 703/1 |

OTHER PUBLICATIONS

K. Y. Lee, C. G. Armstrong, M. A. Price, J. H. Lamont, "A small Feature Suppression/Unsuppression System for Preparing B-Rep Models for Analysis" 2005 ACM, pp. 113-124.*

Venkataraman, et al. "An Investigation of Integrating Design by Features and Feature Recognition," 2000, 19 pages.

Lee, et al. "A Small Feature Suppression/Unsuppression System for Preparing B-Rep Models for Analysis," 2005, 12 pages.

Gopalakrishnan, et al. "A formal theory for estimating defeaturing-induced engineering analysis errors," Computer-Aided Design 39, (2007) 60-68.

Oung, Jianjun. "Design and Implementation of an Object-Oriented Geometric Constraint Solver," 2001, 91 pages.

Mobley, et al. "An Object Oriented Approach to Geometry Defeaturing for Finite Element Meshing," 2007, 17 pages.

Nassar, et al. "Building assembly detailing using constraint-based modeling," Automation in Construction, 12 (2003) 365-379.

Lim, et al. "Incremental Modelling of Ambiguous Geometric Ideas (I-MAGI): Representation and Maintenance of Vague . . . " Artificial Intelligence in Engineering, 15, (2001) 93-108.

SolidWorks: Lesson 5—Making Design Changes. 2006, 19 pages.

* cited by examiner

VARIATIONAL MODELING WITH REMOVAL FEATURES

CROSS-REFERENCE TO OTHER APPLICATIONS

This application is a continuation of U.S. patent application Ser. No. 12/893,557, filed Sep. 29, 2010, now U.S. PAT. NO. 8,612,184, which is hereby incorporated by reference. The present disclosure includes some subject matter in common with commonly-assigned U.S. patent application Ser. No. 12/893,590 for "Variational Modeling with Discovered Interferences," now U.S. Pat. No. 8,510,087, which is hereby incorporated by reference. This application also includes some subject matter in common with U.S. patent application Ser. No. 12/422,410, filed Apr. 13, 2009, U.S. Provisional Patent Application 61/044,622, filed Apr. 14, 2008, and U.S. Provisional Patent Application 61/044,671, filed Apr. 14, 2008, each of which is hereby incorporated by reference.

TECHNICAL FIELD

The present disclosure is directed, in general, to systems and methods for use in computer-aided design, manufacturing, engineering, prototype/test, maintenance, modeling, and visualization (individually and collectively, "CAD" and "CAD systems") and in product lifecycle management ("PLM") and other systems.

BACKGROUND OF THE DISCLOSURE

Many manufactured products are first designed and modeled in CAD systems, and PLM systems are used by manufacturers, retailers, customers, and other users to manage the design, use, maintenance, and disposal of various products. Improved systems are desirable.

SUMMARY OF THE DISCLOSURE

Various embodiments include systems, computer-implemented methods, and computer readable mediums. A method includes receiving a geometric model including at least one removal feature having at least one face. The method includes designating at least one face as a remain variational face and adding a constraint to the designated face. The method includes performing a variational edit on the model using the constraints to the designated face and storing the edited model.

A method includes receiving a geometric model including at least one removal feature having at least one face, the removal feature being a feature that is removed prior to variational solving and recreated after a variational solution has been applied into the geometric model. The method includes designating at least one face of the removal feature as a remain variational face that will not be removed during a variational edit. The method includes adding a constraint to the remain variational face of the removal feature and performing the variational edit on the model to produce an edited model, including applying the constraint. The method includes storing the edited model.

Another method includes receiving a geometric model including at least one removal feature having at least one face and designating at least one face as a remove variational face. The method includes adding a constraint that refers to the designated face and creating a second object corresponding to the removal feature. The method includes modifying the constraint to refer to the second object instead of the removal object and removing the removal object. The method includes performing a variational edit and solve on the model using the second object in place of the removal feature and recreating the model according to the variational edit. The recreated model includes the removal feature placed according to an updated location of the second object.

Another method includes receiving a geometric model including at least one removal feature having at least one face and creating a second object that is associated with the removal feature. The method includes adding a constraint to the second object and removing the removal object from the model and adding a temporary topology to the model to support the removing, the temporary topology being substantially identical to the second object. The method includes binding the temporary topology and the second object and performing a variational edit and solve on the model using the second object to position the temporary topology in the model. The method includes recreating the model according to the variational edit, the recreated model including the removal feature placed according to the location of the temporary topology.

Other embodiments include a data processing system comprising a processor and an accessible memory, where the data processing system is particularly configured to perform processes as described herein. This data processing system can be a single data processing system, or multiple data processing systems acting together. Other embodiments include a non-transitory computer-readable medium encoded with computer-executable instructions that, when executed, cause a data processing system to perform processes as described herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 9E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include improved techniques for use in variational modeling processes.

CAD-type modeling systems or processes are generally classified as variational or parametric according to how they handle equation solving. Parametric systems generally require that the equations be arranged to solve for each variable in terms of other previously solved variables. In 2D and 3D parametric modeling systems, the user defines dimensions and constraints to which the model must conform. Alterations are then automatically reflected in related areas. Strictly speaking, parametrics work in only one direction, i.e., altering entity A will affect entity B, but not vice-versa. In practice, however, most systems allow the changes to operate in either direction.

Variational systems can generally solve multiple constraints or other equations in any form, include 2D and 3D modeling systems in which the user defines a model by dimensions and constraints, which are then solved by a series of simultaneous equations to create and modify geometry. The changes work in both directions, i.e., changes in entity A will affect or be reflected in entity B and vice-versa.

A removal feature, as used herein, is a feature in a two-dimensional or three-dimensional geometric model that must be removed prior to variational solving and then must be recreated after the variational solution has been applied into the model. Removal features that depend on other features are referred to as "dependent." Typically dependence is related to physical proximity and occurs after features have been constructed one on top of the other. An "interference" refers to two overlapping sections, such as if two portions of a solid model intersect each other.

When a model is edited by a user, for example by "dragging" a specific face or other feature to change a dimension, the removal features are removed from the model before the user's edit is applied. The edit is then applied and the model is solved using variational processes, and then the removal features are re-added to the edited model. Various disclosed embodiments include processes for identifying and handling dependences between removal features, interference detection, and geometric model manipulation that successfully handles these issues.

Figure 1:
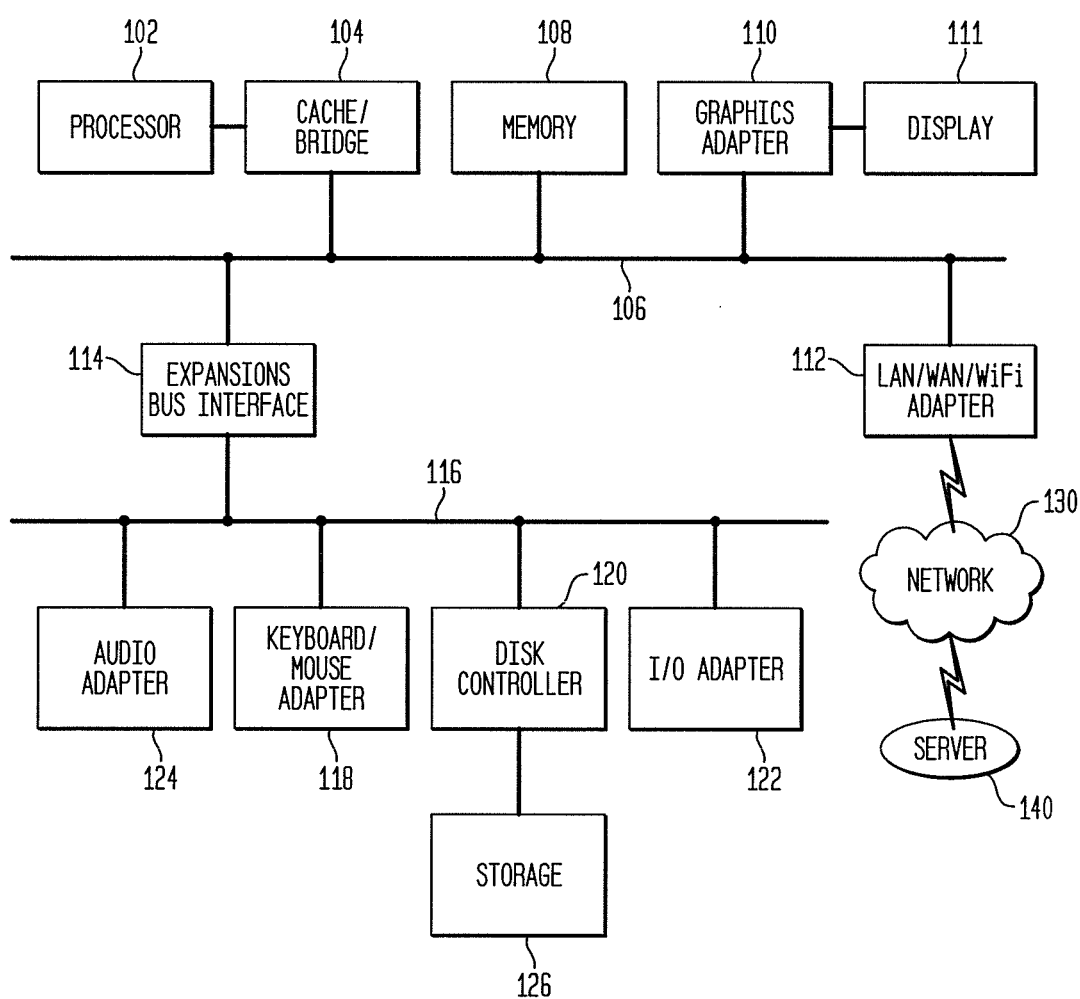
FIG. 1 depicts a block diagram of a data processing system in which an embodiment can be implemented in accordance with disclosed embodiments.

FIG. 1 depicts a block diagram of a data processing system in which an embodiment can be implemented, for example as a CAD or PLM system configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

In a CAD or PLM system such as that discussed herein, the integration of removal features into a variational modeling system introduces several situations where faces or other features cannot be treated variationally, such as cases where the face or other feature cannot drive or be driven by constraints. Various embodiments include techniques for addressing cases where removal features create problems for constraining faces.

In one case, a model includes topologies that are not actually required to be removed, but are labeled as logically part of the feature. Various embodiments include a "Remain Variational" technique for addressing this case, described in more detail below.

Figure 2:
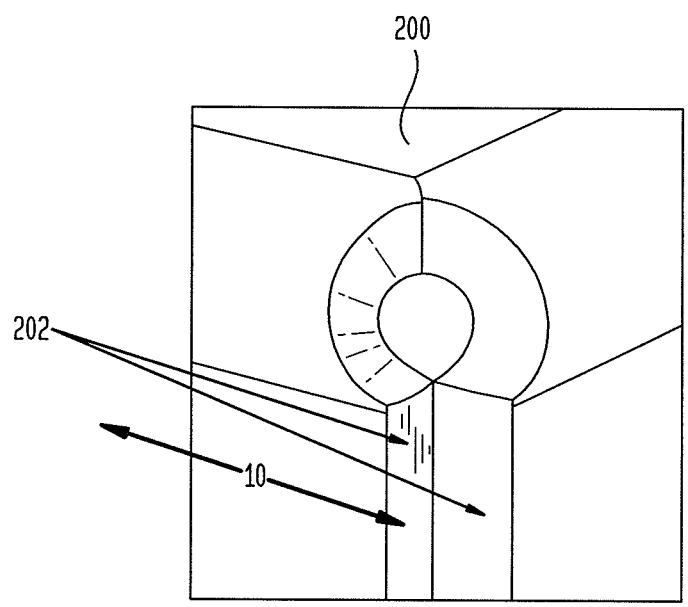
FIG. 2 shows an example of a model of a sheet metal corner removal feature with some faces that are not required to be removed, in accordance with disclosed embodiments.

FIG. 2 shows an example of a model of a sheet metal corner removal feature 200 with two faces that are not required to be removed as in such a case; of course, in other cases, there may be features other than faces that are not required to be removed. This figure shows corner thickness faces 202. These thickness faces of a sheet metal corner are part of the corner removal feature but are not removed. In this example, the thickness faces cannot be constrained because the system cannot predict that they will not be removed, and so the solver cannot assume these faces will exist at the time of solving. The arrow labeled "10" is used to illustrate a constraint on one of the corner thickness faces 202.

In another case, a model includes topologies that are required to be removed, i.e., those that form a substantive part of the feature topology.

Figure 3:
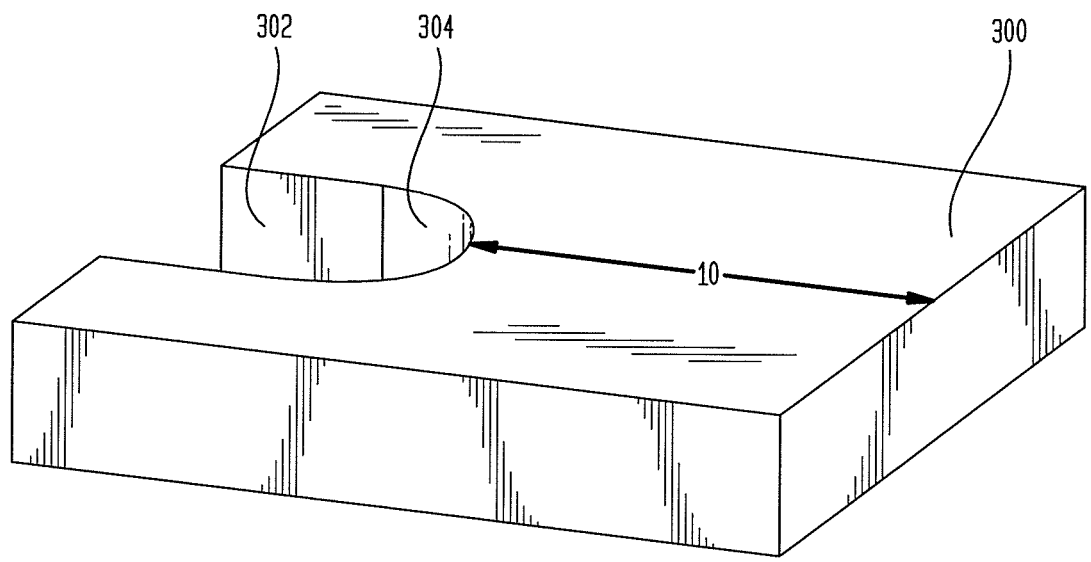
FIG. 3 shows an example of a model of a part with a normal cutout removal feature in accordance with disclosed embodiments.

FIG. 3 shows an example of a model of a part 300 with a normal cutout removal feature 302. The side faces 304 of cutout removal feature 302 form a substantial part of the feature topology and must be removed for variational edits. Various embodiments include a "Remove Variational" technique for addressing this case, described in more detail below. The arrow labeled "10" is used to illustrate a constraint on a face of the cutout removal features 302, but this constraint cannot be maintained since cutout removal feature 302 must be removed during a variational edit.

In another case, a model includes topologies that are temporarily introduced as part of the removal process. These temporary faces (or other features) cannot be constrained because they are not in the initial model and do not exist at the time the variational constraint model is being built.

Figure 4A:
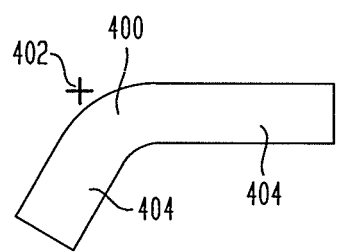
FIGS. 4A-4C show an example of a model of a bend that includes temporary thickness faces introduced under a sheet metal bend removal in accordance with disclosed embodiments.
Figure 4B:
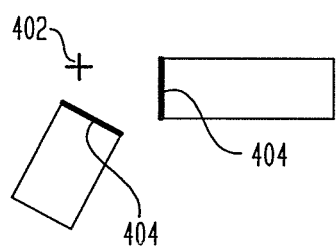
Figure 4C:
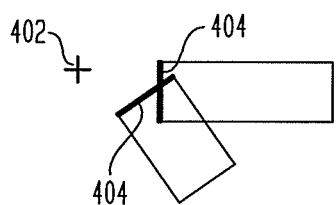

FIGS. 4A-4C show an example of a model of a bend 400 that includes temporary thickness faces introduced under a sheet metal bend removal. In FIG. 4A the bend 400 is shown which is to rotate around point 402. To support the edit, the system creates temporary thickness faces 404, but these are not part of the model itself.

The system builds the constraint system, but the temporary thickness faces 404 cannot be constrained since they are not part of the model.

FIG. 4B illustrates when the bend feature 400 is removed, leaving the temporary thickness faces 404 used to heal the model.

FIG. 4C illustrates the problem when the rotation about point 402 results in unwanted interference between the unconstrained thickness faces 404. This results in failure of the edit operation since the temporary thickness faces 404 could not be properly handled.

Various embodiments include a "Late Binding" technique for addressing this case, described in more detail below.

Figure 5:
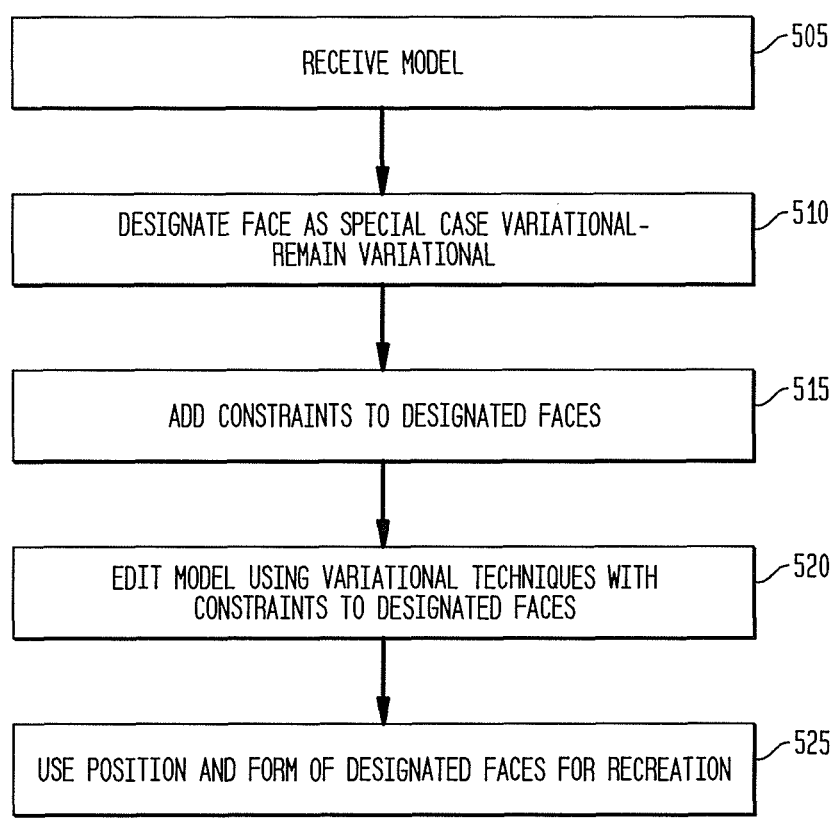
FIG. 5 depicts a flowchart of a "Remain Variational" process in accordance with disclosed embodiments.

FIG. 5 depicts a flowchart of a "Remain Variational" process in accordance with disclosed embodiments.

The system receives a geometric model (step 505). As used herein, "receiving" can include loading from storage, receiving from another system such as over a network or otherwise, receiving via an interaction with a user, or otherwise. The "system" in the processes described herein, can include one or more data processing systems, such as data processing system 100 or otherwise, that are particularly configured to perform the processes described, and can include data processing systems implemented as CAD or PLM systems. The geometric model includes multiple features, including at least one removal feature having at least one face.

The system designates one or more faces of the removal feature as remain variational (step 510). This step can include receiving such a designation from an application or user, and can be implemented by assigning a flag to the faces that mark them as "remain variational" or otherwise as a special case variational.

During processing, such as an editing process or other manipulation of the model, constraints are added to the one or more designated faces (step 515). Of course, not all actual editing processes will require a constraint to be added at this point, but the disclosed embodiments allow such an addition. The system typically adds the constraint in response to a user input.

The system can thereafter allow the model to be processed and edited using conventional variational solving techniques, and including using the constraints to the designated faces (step 520).

The system can re-create the model using the solved position and form of the designated faces in order to locate and form the removal feature on re-creation (step 525). This step can be performed in some cases by allowing applications or systems to so use the designated faces. In this way, the system recreates the removal feature based on an edited location of the designated face. The edited model can be stored, displayed, and/or transmitted to another system.

Because these faces are designated as "remain variational", the system can apply constraints knowing that these faces will remain present in the model to be controlled by the constraints. This is a significant technical advantage over conventional systems that cannot constrain these faces because the system cannot predict that they will not be removed and cannot assume these features will exist at the time of solving.

Figure 6:
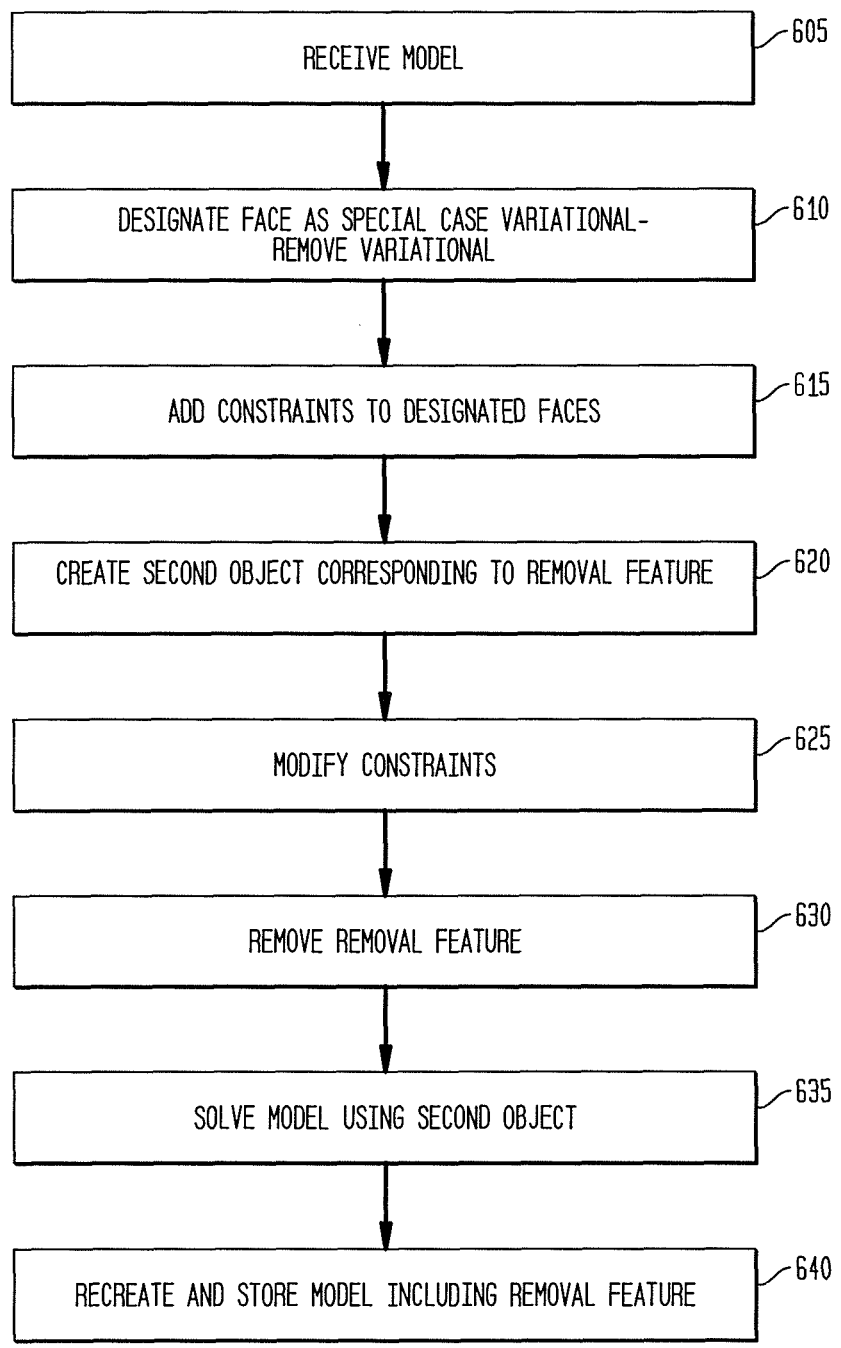
FIG. 6 depicts a flowchart of a "Remove Variational" process in accordance with disclosed embodiments.

FIG. 6 depicts a flowchart of a "Remove Variational" process in accordance with disclosed embodiments.

The system receives a geometric model (step 605). The geometric model includes multiple features, including at least one removal feature having at least one face.

The system designates one or more faces of the removal feature as remove variational (step 610). This step can include receiving such a designation from an application or user, and can be implemented by assigning a flag to the faces that mark them as "remain variational" or otherwise as a special case variational.

During processing, such as an editing process or other manipulation of the model, constraints are added to the one or more designated faces (step 615). Of course, not all actual editing processes will require a constraint to be added at this point, but the disclosed embodiments allow such an addition. The system typically adds the constraint in response to a user input.

During the build of the variational constraint system for a variational edit, the system will create a second object corresponding to the removal feature with designated faces (step 620). This second object can be a copy of the removal feature, a simplified copy, or another placeholder object that contains sufficient information to allow the removal feature to be recreated from the second object.

The system modifies constraints of the model that reference the removal feature so that they reference the second object instead (step 625).

The removal feature is removed from the model before solving (step 630), consistent with conventional treatment of a removal feature.

The model is edited and solved using the second object in place of the removal feature (step 635). As part of this step, the new positions resulting from the variational edit can be applied to the boundary representations of various features and to the second object, and so the second object can have a different form and position as a result of the edit. In this way, performing the variational edit includes moving a location of the second object in the model according to the constraints.

The system recreates the model corresponding to the variational edit (step 640), where the recreated model includes the removal feature that is placed so that it corresponds to any updated form or position of the second object. The recreated model can be stored, displayed, and/or transmitted to another system.

This process provides a distinct technical advantage over conventional process that cannot constrain the removal feature since it is required to be removed from the model before solving. The second object is used by the system to correspond to the removal feature but with the capability of being constrained, and can then be used in the re-creation step to build the updated and properly constrained model.

FIGS. 7A-7D illustrate the process of FIG. 6.

Figure 7A:
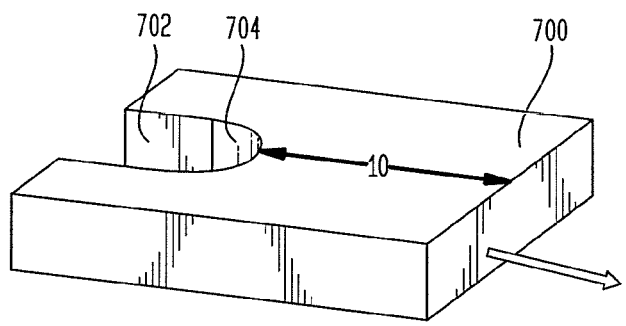
FIGS. 7A-7D illustrate the process of FIG. 6.

FIG. 7A, like FIG. 3, shows an example of a model of a part 700 with a normal cutout removal feature 702. The side faces 704 of cutout removal feature 702 form a substantial part of the feature topology and must be removed for variational edits. The arrow labeled "10" is used to illustrate a constraint on a face of the cutout removal feature 702, but this constraint cannot be maintained since cutout removal feature 702 must be removed during a variational edit. The large arrow shows that the system is to perform a variational edit to move the right face of the model to "stretch" the object to the right. Note that the cutout removal feature is intended to be constrained by its distance to that right face.

Figure 7B:
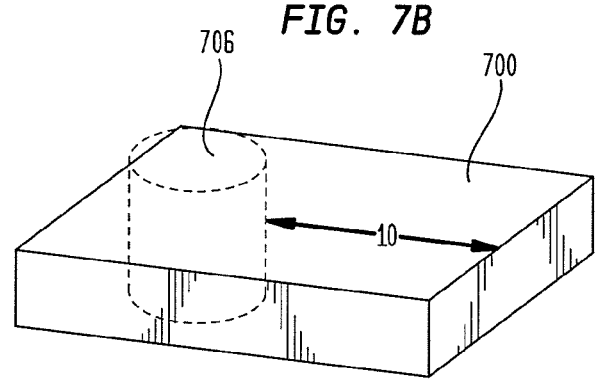

FIG. 7B shows the model 700 with the cutout removal feature 702 removed and replaced by a simplified, non-topologically connected second object 706 (shown in dashed lines). The constraint is applied to the second object 706.

Figure 7C:
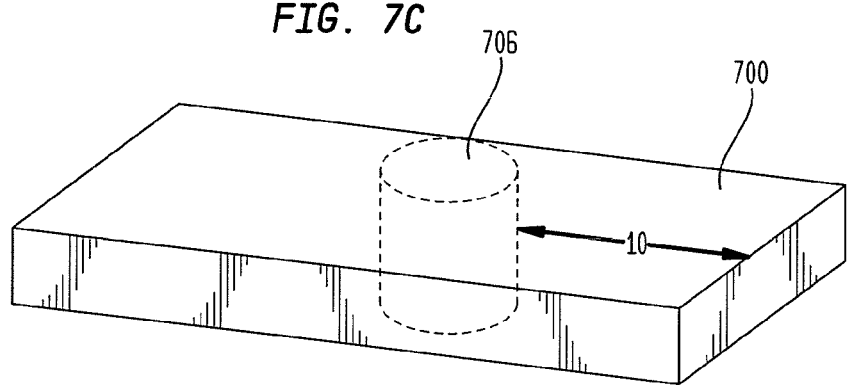

FIG. 7C shows that the variational edit is applied by stretching the model 700 to the right. The second object 706 is also moved to maintain the constraint in relation to the right face.

Figure 7D:
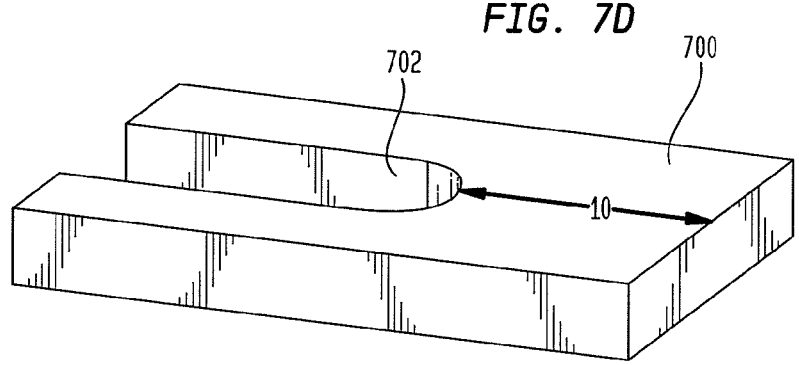

FIG. 7D shows that the model 700 is recreated after the variational edit, including the cutout removal feature 702, and cutout removal feature is located in the edited position corresponding to the second object, as the second object was constrained against the right face.

Figure 8:
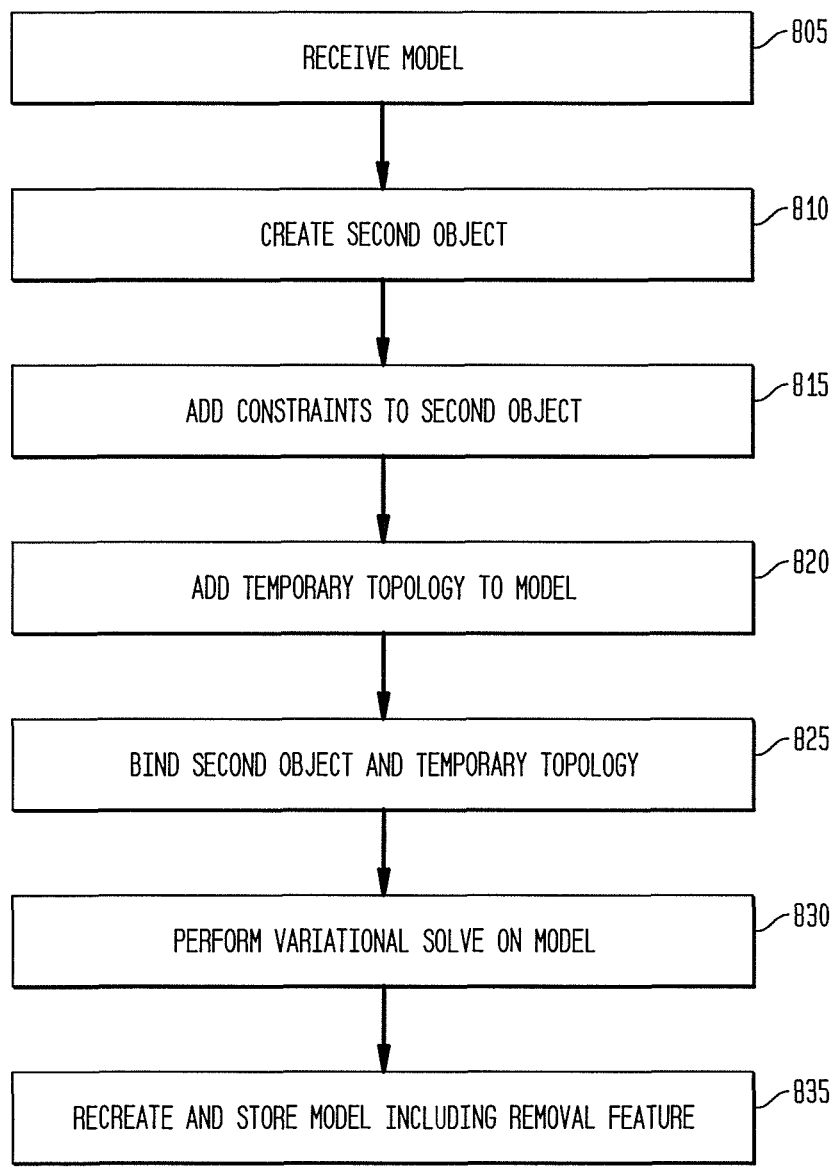
FIG. 8 depicts a flowchart of a "Late Binding" process in accordance with disclosed embodiments.

FIG. 8 depicts a flowchart of a "Late Binding" process in accordance with disclosed embodiments for cases in which a temporary feature is used when a removal feature is removed.

The system receives a geometric model (step 805). The geometric model includes multiple features, including at least one removal feature having at least one face.

While the variational solver is being built, and before the removal feature is removed from the model, the system creates a second object associated with the removal feature (step 810), such as a proxy geometry, that is substantially identical to the temporary topology that will be later introduced during the removal stage. In this context, "substantially identical" is intended to indicate that the second object and temporary topology can be bound together and used in place of each other, though there may be other differences that do not affect this process.

The system adds at least one constraint to the second object (step 815). Of course, not all actual editing processes will require a constraint to be added at this point, but the disclosed embodiments allow such an addition. The system typically adds the constraint in response to a user input.

When the removal feature is to be removed, the system adds a temporary topology into the model to support the removal (step 820). The temporary topology has substantially identical geometry to the second object.

The system binds the temporary topology and the second object (step 825). By binding them, these two objects should always be moved or changed in the same way.

The system performs a variational edit and solve on the model (step 830) including using the constrained second object to drive the late bound temporary topology to correctly position temporary topology.

The system recreates the model after the variational solve (step 835). During this process, the removal feature is recreated according to the post-edit position of the temporary topology, which is the same position as the constrained second object. This process also typically results in the removal of the temporary topology. The system can also discard the second object and its constraints at this point. The recreated model can be stored, displayed, and/or transmitted to another system.

FIGS. 9A-9E illustrate the process of FIG. 8.

Figure 9A:
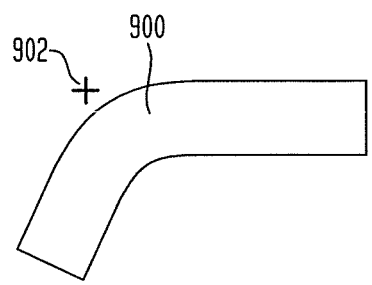
FIGS. 9A-9E illustrate the process of FIG. 8.

FIG. 9A, shows an example of a model of a bend 900 which is to rotate around point 902.

Figure 9B:
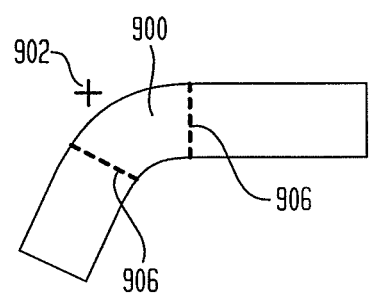

FIG. 9B shows that the constraint system is built. The system adds construction planes 906, as the second objects, in the position where the temporary thickness faces will later be added; of course, in other cases, the temporary features may include features other than faces. The construction planes are constrained, in this example using a construction involving a tangent cylinder 910 shown in FIG. 9D, so as to avoid interference.

Figure 9C:
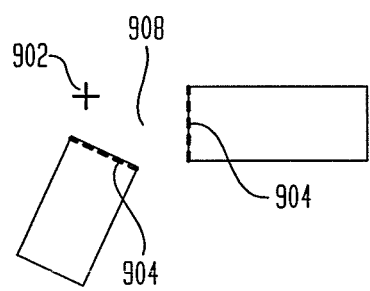

FIG. 9C shows where the bend feature is removed at area 908, and temporary thickness faces 904 are introduced to heal the model. These temporary thickness faces are bound to the second object construction planes 906.

Figure 9D:
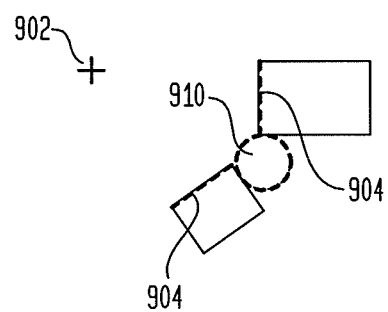

FIG. 9D shows that the constraints on the construction planes, reflected to the thickness faces by the binding, cause the thickness faces 904 to adjust under rotation, using constraint feature 910, so that the edit succeeds.

Figure 9E:
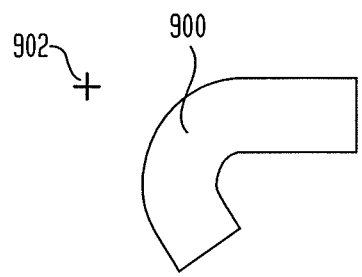

FIG. 9E shows that the removal feature bend 900 is reintroduced into the model after the edit, and the temporary thickness faces are removed.

This approach provides a distinct technical advantage in effectively allowing constraints to the temporary faces so that the variational edit and recreation will succeed, where conventional systems would fail.

In some cases, the late binding described herein may have extended application for other situations where a proxy geometry is needed at the configure time and the real geometry is only available later.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully-functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method implemented in one or more data processing systems, comprising:
    receiving a geometric model including at least one removal feature having at least one face, the removal feature being a feature that is removed prior to variational solving and recreated after a variational solution has been applied into the geometric model;
    designating at least one face of the removal feature as a remain variational face that will not be removed during a variational edit;
    adding a constraint to the remain variational face of the removal feature;
    performing the variational edit on the model to produce an edited model, including applying the constraint, wherein performing the variational edit includes removing the removal feature from the geometric model, performing a variational solve of the geometric model including the remain variational face but not including other faces of the removal feature, and recreating the removal feature after the variational solve has been applied to the geometric model; and
    storing the edited model.

2. The method of claim 1, wherein the one or more data processing systems recreate the removal feature based on an edited location of the remain variational face and according to the constraint.

3. The method of claim 1, wherein the one or more data processing systems comprise a computer-aided-design system.

4. The method of claim 1, wherein the removal feature includes at least one face not designated as a remain variational face, and no constraint can be added to the face not designated as a remain variational face.

5. The method of claim 1, wherein the remain variational face is a face of the removal feature that remains in the geometric model during the variational edit while other faces of the removal feature are removed from the geometric model during the variational edit.

6. A data processing system comprising:
    a processor; and
    an accessible memory,
    the data processing system particularly configured to
    receive a geometric model including at least one removal feature having at least one face, the removal feature being a feature that is removed prior to variational solving and recreated after a variational solution has been applied into the geometric model;
    designate at least one face of the removal feature as a remain variational face that will not be removed during a variational edit;
    add a constraint to the remain variational face of the removal feature;
    performing the variational edit on the model to produce an edited model, including applying the constraint, wherein performing the variational edit includes removing the removal feature from the geometric model, performing a variational solve of the geometric model including the remain variational face but not including other faces of the removal feature, and recreating the removal feature after the variational solve has been applied to the geometric model; and
    store the edited model.

7. The data processing system of claim 6, wherein the data processing system recreates the removal feature based on an edited location of the remain variational face and according to the constraint.

8. The data processing system of claim 6, wherein the data processing system is a computer-aided-design system.

9. The data processing system of claim 6, wherein the removal feature includes at least one face not designated as a remain variational face, and no constraint can be added to the face not designated as a remain variational face.

10. The data processing system of claim 6, wherein the remain variational face is a face of the removal feature that remains in the geometric model during the variational edit while other faces of the removal feature are removed from the geometric model during the variational edit.

11. A non-transitory computer-readable medium encoded with computer-executable instructions that, when executed, cause a data processing system to:
- receive a geometric model including at least one removal feature having at least one face, the removal feature being a feature that is removed prior to variational solving and recreated after a variational solution has been applied into the geometric model;
- designate at least one face of the removal feature as a remain variational face that will not be removed during a variational edit;
- add a constraint to the remain variational face of the removal feature;
- performing the variational edit on the model to produce an edited model, including applying the constraint, wherein performing the variational edit includes removing the removal feature from the geometric model, performing a variational solve of the geometric model including the remain variational face but not including other faces of the removal feature, and recreating the removal feature after the variational solve has been applied to the geometric model; and
- store the edited model.

12. The non-transitory computer-readable medium of claim 11, wherein the data processing system recreates the removal feature based on an edited location of the remain variational face and according to the constraint.

13. The non-transitory computer-readable medium of claim 11, wherein the removal feature includes at least one face not designated as a remain variational face, and no constraint can be added to the face not designated as a remain variational face.

14. The non-transitory computer-readable medium of claim 11, wherein the remain variational face is a face of the removal feature that remains in the geometric model during the variational edit while other faces of the removal feature are removed from the geometric model during the variational edit.

* * * * *